(12) United States Patent
Omori et al.

(10) Patent No.: US 7,522,483 B2
(45) Date of Patent: Apr. 21, 2009

(54) DISC DRIVE UNIT AND DISC RECORDING AND/OR REPRODUCING APPARATUS

(75) Inventors: Kiyoshi Omori, Tokyo (JP); Satoshi Muto, Chiba (JP)

(73) Assignee: Sony Corporation (JP)

( * ) Notice: Subject to any disclaimer, the term of this patent is extended or adjusted under 35 U.S.C. 154(b) by 703 days.

(21) Appl. No.: 11/108,739

(22) Filed: Apr. 19, 2005

(65) Prior Publication Data

US 2005/0246729 A1 Nov. 3, 2005

(30) Foreign Application Priority Data

Apr. 28, 2004 (JP) ............................. 2004-134633

(51) Int. Cl.
*G11B 7/00* (2006.01)
(52) U.S. Cl. .................................. 369/44.14
(58) Field of Classification Search ....................... None
See application file for complete search history.

(56) References Cited

U.S. PATENT DOCUMENTS

2003/0214899 A1* 11/2003 Furuya et al. ................ 369/249
2004/0032817 A1* 2/2004 Hikake et al. ............... 369/213

FOREIGN PATENT DOCUMENTS

JP 2001-222823 8/2001
JP 2002-171709 6/2002

* cited by examiner

*Primary Examiner*—Paul Huber
(74) *Attorney, Agent, or Firm*—Rader Fishman & Grauer PLLC; Ronald P. Kananen

(57) ABSTRACT

Disc drive units out of the tolerance for assembling errors are rejected by narrowing the skew regulation range for them. Such a disc drive unit comprises a base plate, an optical pickup for writing a signal on and/or reading a signal from the optical disc, a pair of guide shafts for allowing the optical pickup to slide in a radial direction of the optical disc, support means, each being adapted to support the corresponding one of the guide shafts by pinching the opposite ends of the guide shaft between itself and the base plate, urging members for urging the respective ends of the guide shafts in the sense of the height thereof, regulation members for regulating the supported positions of the ends of the guide shafts, a skew regulation means having respective bearing sections including respective holding holes for holding the respective urging members, respective guide slits for receiving and guiding the respective ends of the guide shafts and respective insertion holes exposed to the respective holding holes and applied to receive the respective regulation members and limiting sections arranged between the base plate and the corresponding respective support means and adapted to limit the respective movable ranges of the guide shafts driven to move by the respective skew regulation means in the sense of the height thereof.

14 Claims, 9 Drawing Sheets

DISC DRIVE UNIT AND DISC RECORDING AND/OR REPRODUCING APPARATUS

CROSS REFERENCE TO RELATED APPLICATIONS

The present invention contains subject matter related to Japanese Patent Application JP 2004-134633 filed in the Japanese Patent Office on Apr. 28, 2004, the entire contents of which being incorporated herein by reference.

BACKGROUND OF THE INVENTION

1. Field of the Invention

This invention relates to a disc drive unit having a skew regulation mechanism for correcting the inclination, if any, of the optical pickup thereof relative to the optical disc and also to a disc recording and/or reproducing apparatus comprising such a disc drive unit.

2. Description of the Related Art

Known optical discs include CDs (compact discs) and DVDs (digital versatile discs) as well as MOs (magneto-optical discs) and MDs (mini discs). A variety of disc recording and/or reproducing apparatus have been marketed for such discs and disc cartridges containing discs of the sort under consideration.

FIG. 1 of the accompanying drawings schematically illustrates a known disc drive unit 200 of a disc recording and/or reproducing apparatus adapted to record information signals onto or reproduce information signals from an optical disc. Referring to FIG. 1, the known disc drive unit 200 comprises a disc rotary drive mechanism 201 for driving an optical disc to rotate, an optical pickup 202 for carrying out an operation of writing signals onto or reading signals from an optical disc that is driven to rotate by the disc rotary drive mechanism 201 and a pickup feed mechanism 203 for driving and feeding the optical pickup 202 to move in a radial direction of the optical disc. The above listed components of the disc drive unit 200 are fitted to a base 204.

The disc rotary drive mechanism 201 includes a flat spindle motor 206 that is equipped with a turntable 205 for holding an optical disc. The spindle motor 206 drives the optical disc to rotate integrally with the turntable 205.

The optical pickup 202 writes signals onto or read signals from the optical disc by converging the beam of light (laser beam) emitted from a semiconductor laser by means of an objective lens 207, irradiating the converged beam of light onto the signal recording surface of the optical disc and detecting the returning beam of light reflected by the signal recording surface of the optical disc.

The pickup feed mechanism 203 includes a pair of guide shafts 208a, 208b that support the optical pickup 202 so as to be movable in a radial direction of the optical disc, a rack member 209 fitted to the optical pickup 202, a lead screw 210 to be engaged with the rack member 209 and a stepping motor 211 for driving the lead screw 210 to rotate. As the stepping motor 211 drives the lead screw 210 to rotate, it consequently drives the rack member 209 that is engaged with the lead screw 210 to be displaced with the optical pickup 202 in a radial direction of the optical disc.

The base 204 has a table aperture 212a for exposing the turntable 205 and a pickup aperture 212b for exposing the optical pickup 202. The two apertures 212a, 212b are continued from each other. A number of components including the spindle motor 206, the opposite ends of the pair of guide shafts 208a, 208b, the lead screw 210 and the stepping motor 211 are fitted to the main surface of the disc drive unit that is opposite to the other main surface where the turntable 205 and the optical pickup 202 are exposed to the outside by way of the apertures 212a, 212b.

In the disc drive unit 200 of the disc recording and/or reproducing apparatus configured as described above, the disc rotary drive mechanism 201 drives the optical disc to rotate and the pickup feed mechanism 203 drives and feeds the optical pickup 202 to move in a radial direction of the optical disc so that the optical pickup 202 operates for writing signals onto or reading signals from the optical disc. As a result, information signals are recorded onto or reproduced from the target recording tracks of the optical disc.

For disc drive units of the above described type, efforts are being paid to record signals highly densely on an optical disc by reducing the wavelength of the beam of light to be irradiated from the optical pickup 202 onto the optical disc and increasing the numerical aperture of the objective lens 207. However, as the wavelength of the beam of light to be irradiated onto the optical disc is reduced and the numerical aperture of the objective lens 207 is increased, aberration occurs frequently when the optical axis of the beam of light emitted from the optical pickup 202 is inclined relative to the signal recording surface of the optical disc (a phenomenon referred to as skew hereinafter) to consequently and remarkably degrade the signal recording/reproducing performance of the disc drive unit. In other words, the tolerance of the disc drive unit 200 is reduced for the skew as the recording density of the optical disc increases. Therefore, it is necessary to irradiate the beam of light converged by the objective lens of the optical pickup 202 perpendicularly relative to the signal recording surface of the optical disc that is held on the turntable 205 for the purpose of improving the signal recording/reproducing performance of the disc drive unit 200.

Known techniques for correcting the inclination of the optical pickup 202 relative to the optical disc include one that is designed to regulate the fitting angle of the spindle motor 206 relative to the base 204 (see, inter alia, Patent Document 1: Jpn. Pat. Appln. Laid-Open Publication No. 2002-171709) and one that is designed to adjust the inclination of the pair of guide shafts 208a, 208b that supports the optical pickup 202 (see, inter alia, Patent Document 2: Jpn. Pat. Appln. Laid-Open Publication No. 2001-222823).

In the above described disc drive unit 200, the pair of guide shafts 208a, 208b is fitted at the opposite ends thereof to the lower surface of the base 204 typically by way of a skew regulation mechanism 220, as shown in FIG. 2.

The skew regulation mechanism 220 is adapted to support the pair of guide shafts 208a, 208b at the opposite ends of the latter so as to make it possible to move them in a direction perpendicularly intersecting the main surfaces of the base 204 and independently regulate the supported positions of the opposite ends of the guide shafts 208a, 208b in order to regulate the inclination of the guide shafts 208a, 208b.

More specifically, the skew regulation mechanism 220 has bearing members 221 for supporting the opposite ends of the pair of guide shafts 208a, 208b, as shown in FIGS. 2 and 3. Each of the bearing members 221 has a holding hole 223 for holding a coil spring 222 and a guide slit 224 exposed to the holding hole 223 and adapted to receive the corresponding one of the end sections 208c of the guide shaft 208a or 208b. The holding hole 223 runs through the bearing member 221 in a transversal direction of the bearing member 221 and the coil spring 222 is arranged in the holding hole 223 and compressed between the base 204 and the corresponding end section 208c of the guide shaft 208a or 208b, whichever appropriate. The guide slit 224 is formed by transversally notching the bearing member 221 so as to guide the end section 208c of the guide shaft 208a or 208b, whichever appropriate, in a direction perpendicularly intersecting the main surfaces of the base 204. On the other hand, as shown in FIG. 4, the end section 208c of the guide shaft 208a or 208b, whichever appropriate, has a reduced diameter so as to be snugly inserted into the guide slit 224 and is coaxial with the guide shaft relative to the axial center S' of the guide shaft. Referring to FIGS. 2 and 3, there is also provided a support plate 225 for pinching the bearing member 221 between itself and the base 204. The support plate 225 is equipped with a screw hole 227 for receiving an adjuster screw 226 so as to be engaged with the latter. The screw hole 227 is exposed to the holding hole 223. The front end of the adjuster screw 226 is made to abut the end section 208c of the guide shaft 208a or 208b, whichever appropriate, from the side opposite to the coil spring 222 while it is held in the state of being engaged with the screw hole 227.

With the above-described arrangement of the skew regulation mechanism 220, it is possible to change the compressed state of the coil spring 222 that is held in the holding hole 223 by adjusting the extent by which the adjuster screw 226 is driven. As a result, it is possible to adjust the inclination of each of the guide shafts 208a, 208b in such a way that the beam of light converged by the objective lens 207 is irradiated onto the signal recording surface of the optical disc perpendicularly relative to the latter by moving the optical pickup 202 in a transversal direction relative to the main surfaces of the base 204, while adjusting the positions at which the ends 208c of the guide shafts 208a, 208b are supported.

The above described skew regulation mechanism 220 is provided with a satisfactory skew margin by limiting the total of the fitting errors of the members of the disc drive unit 200 to about ±0.4 mm and considering the fitting accuracy of the spindle shaft and the turntable 205 of the spindle motor 206 fitted to the base 204 and the assembling accuracy of the optical system including the objective lens 207 arranged in the optical pickup 202. In other words, the skew regulation mechanism 220 is provided with a margin of about ±0.4 mm, by which each of the guide shafts 208a, 208b inserted into the respective bearing members 221 is allowed to move from the designed position in a transversal direction of the base 204. Therefore, the disc drive unit 200 can correct the inclination of the optical axis of the optical beam relative to the signal recording surface of the optical disc to nil if any of the spindle shaft of the spindle motor 206, the turntable 205 and the optical system including the optical pickup 202 has a manufacturing error and/or a mounting error provided that the errors are within ±0.4 mm as viewed from the design value.

Additionally, as a result of the development of high density recording optical discs in recent years realized by using a narrow pitch of arrangement of recording tracks and reducing the pit size, there are optical pickups that are adapted to operate for skew regulation on a real time basis. Such optical pickups are adapted to be subjected to an operation of skew regulation independently relative to the optical system of the optical pickup (see, inter alia, Patent Document 3: Jpn. Pat. Appln. Laid-Open Publication No. 2004-39024).

With such a skew regulation technique, the inclination, if any, of the optical pickup 202 is corrected relative to the optical disc before it is mounted on the base 204 by carrying out an operation of skew regulation in advance relative to the optical system of the pickup 202. Therefore, if a skew margin of about ±0.4 mm is provided in total for the mounting error of the component members of the disc drive unit 200 including the optical pickup 202 in the operation of skew regulation of the disc drive unit 200 that is carried out after mounting the optical pickup 202 on the base 204, the error range that is allowed to each of the component members of the disc drive unit 200 except the optical system of the optical pickup 202 is inevitably expanded. In other words, it may not be possible to eliminate disc drive units 200 of a precision level that is out of the tolerance of the assembling precision. Particularly, if the height of the entire apparatus is reduced to about 9.5 mm that is substantially equal to the height of the hard disc drive (HDD) contained in it, there arises a risk that the optical pickup 202 scrapes the optical disc and/or the bottom of the disc recording and/or reproducing apparatus when the optical pickup 202 is driven to move in a radial direction of the optical disc along the guide shafts 208a, 208b.

SUMMARY OF THE INVENTION

In view of the above identified circumstances, it is desirable to provide a disc drive unit that is optimally regulated for the skew, if any, of its optical pickup with a narrowed scope of skew regulation after mounting the optical pickup, the optical axis of which has been corrected in advance, and also a disc recording and/or reproducing apparatus having such a disc drive unit.

According to the present invention, the above object is achieved by providing a disc drive unit comprising: a base plate; a disc rotary drive mechanism for holding an optical disc and driving the optical disc to rotate; an optical pickup for writing a signal on and/or reading a signal from the optical disc by focusing the light beam emitted from a light source on the signal recording surface of the optical disc by means of an objective lens and detecting the returning beam of light reflected by the optical disc; a pair of guide shafts arranged at the lower surface side of the base plate to allow the optical pickup to slide in a radial direction of the optical disc; support means, each being adapted to support the corresponding one of the guide shafts at the lower surface side of the base plate by pinching the opposite ends of the guide shafts between itself and the base plate; urging members arranged to abut the respective ends of the guide shafts from a direction substantially perpendicular to the main surface of the base plate and urging the respective ends of the guide shafts in a direction perpendicular to the main surface of the base plate; regulation members arranged to abut the respective ends of the guide shafts from the direction opposite to the direction substantially perpendicular to the main surface of the base plate and pressing the respective ends of the guide shafts in the direction opposite to the urging direction of the urging members so as to regulate the supported positions of the ends of the guide shafts; a skew regulation means having respective bearings including respective holding holes for holding the respective urging members, respective guide slits exposed to the respective holding holes to receive the respective ends of the guide shafts and guide the respective ends of the guide shafts in a direction perpendicular to the main surface of the base plate and respective insertion holes exposed to the respective holding holes and adapted to receive the respective regulation members; and limiting sections arranged between the base plate and the corresponding respective support means and adapted to limit the respective movable ranges of the guide shafts driven to move by the respective skew regulation means in a direction substantially perpendicular to the main surface of the base plate.

Also, according to the present invention, there is provided a disc recording and/or reproducing apparatus comprising: an apparatus main body including a pair of upper and lower halves; a disc transfer means for transferring an optical disc from the outside to the inside of the apparatus main body or vice versa through a lateral side of the apparatus main body;

a base plate; a disc rotary drive mechanism for holding an optical disc and driving the optical disc to rotate; an optical pickup for writing a signal on and/or reading a signal from the optical disc by focusing the light beam emitted from a light source on the signal recording surface of the optical disc by means of an objective lens and detecting the returning beam of light reflected by the optical disc; a pair of guide shafts arranged at the lower surface side of the base plate to allow the optical pickup to slide in a radial direction of the optical disc; support means, each being adapted to support the corresponding one of the guide shafts at the lower surface side of the base plate by pinching the opposite ends of the guide shafts between itself and the base plate; urging members arranged to abut the respective ends of the guide shafts from a direction substantially perpendicular to the main surface of the base plate and urging the respective ends of the guide shafts in a direction perpendicular to the main surface of the base plate; regulation members arranged to abut the respective ends of the guide shafts from the direction opposite to the direction substantially perpendicular to the main surface of the base plate and pressing the respective ends of the guide shafts in the direction opposite to the urging direction of the urging members so as to regulate the supported positions of the ends of the guide shafts; a skew regulation means having respective bearings including respective holding holes for holding the respective urging members, respective guide slits exposed to the respective holding holes to receive the respective ends of the guide shafts and guide the respective ends of the guide shafts in a direction perpendicular to the main surface of the base plate and respective insertion holes exposed to the respective holding holes and adapted to receive the respective regulation members; and limiting sections arranged between the base plate and the corresponding respective support means and adapted to limit the respective movable ranges of the guide shafts driven to move by the respective skew regulation means in a direction substantially perpendicular to the main surface of the base plate.

Thus, with a disc drive unit and a disc recording and/or reproducing apparatus according to the invention, the scope of regulation of the skew regulation means is confined in a direction perpendicular to the main surface of the base plate to a predetermined range that is centered at the designed initial position by the limiting section arranged between the base plate and the support means so that it is impossible to regulate any disc drive unit that requires skew height regulation beyond the scope of regulation and hence such a disc drive unit will be rejected.

DETAILED DESCRIPTION OF THE PREFERRED EMBODIMENTS

Now, a disc drive unit and a disc recording and/or reproducing apparatus according to the invention will be described in greater detail by referring to the accompanying drawings that illustrate preferred embodiments of the invention.

Figure 1:
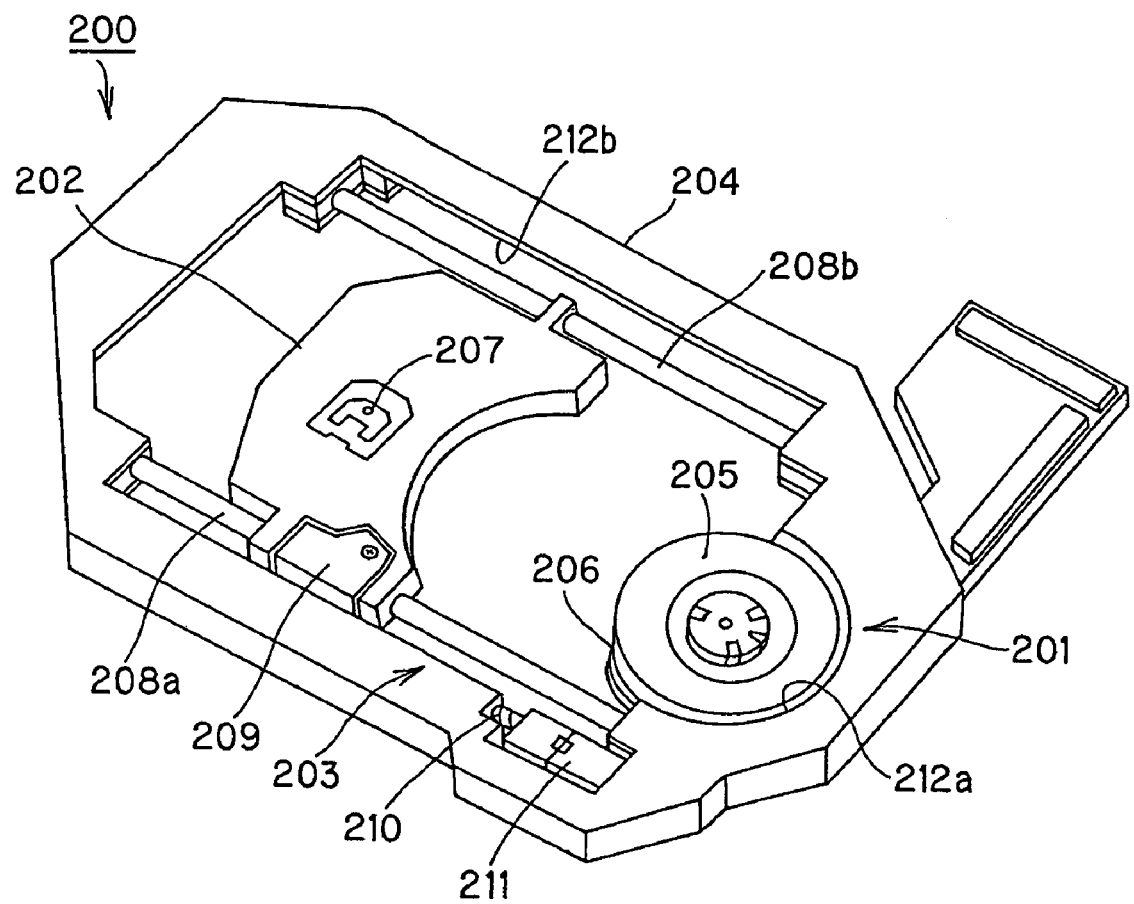
FIG. 1 is a schematic perspective view of a known disc drive unit.
Figure 2:
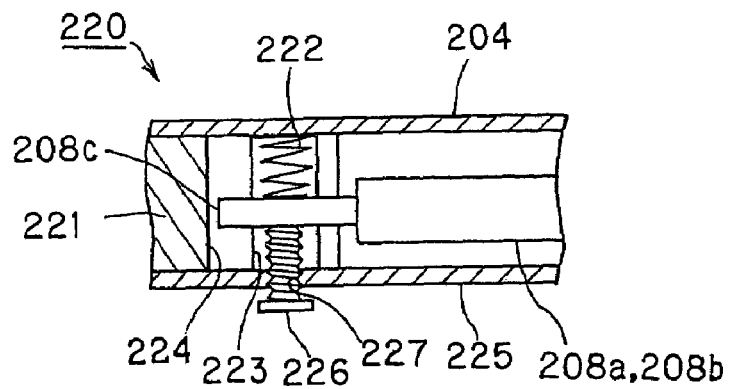
FIG. 2 is a schematic cross sectional view of a known skew regulation mechanism, illustrating the configuration thereof taken in an axial direction thereof.
Figure 3:
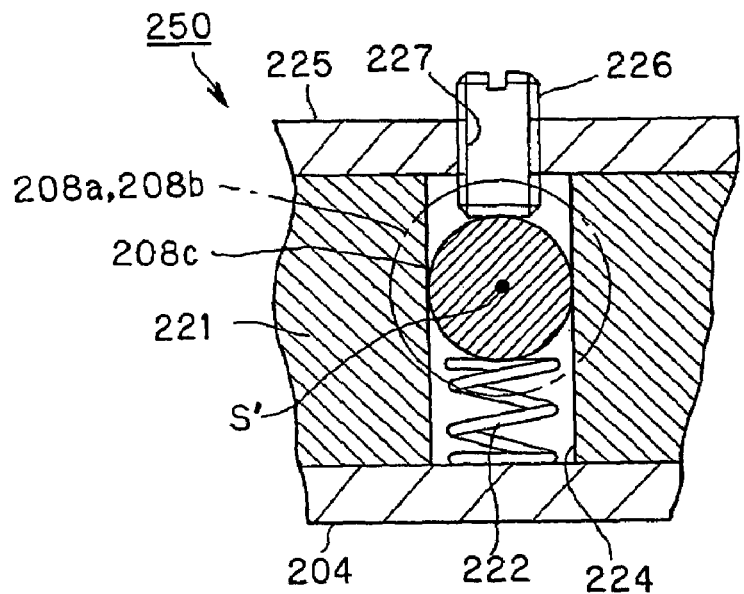
FIG. 3 is a schematic cross sectional view of the known skew regulation mechanism of FIG. 2 taken in a direction perpendicular to the axial line thereof.
Figure 4:
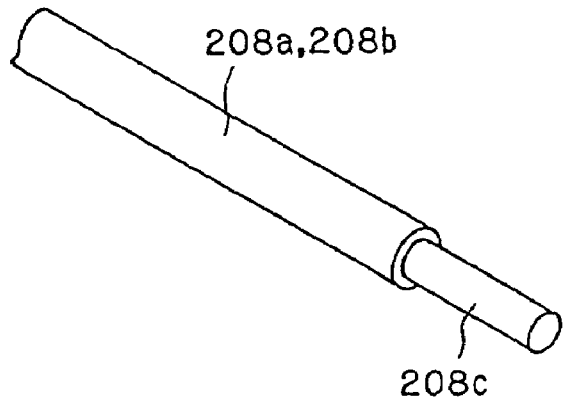
FIG. 4 is a schematic perspective view of an end of the guide shaft of the known skew regulation mechanism of FIG. 2.
Figure 5:
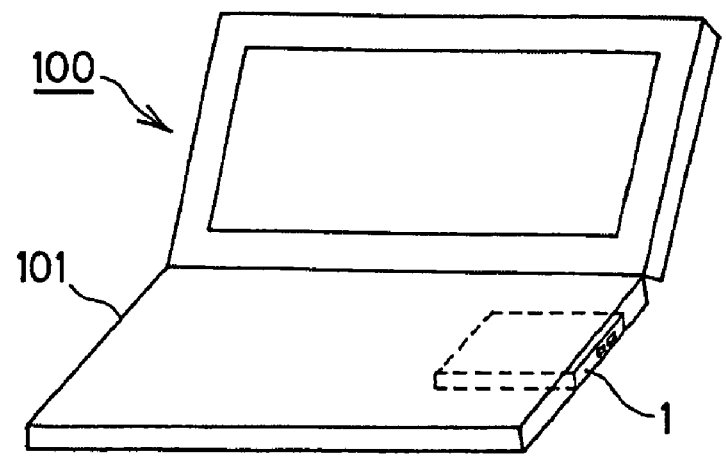
FIG. 5 is a schematic perspective view of a note-type personal computer carrying a disc drive unit according to the invention.

Referring first to FIG. 5, a disc drive unit 1 according to the invention is designed to be typically mounted in the main body 101 of a note-type personal computer 100. As seen from FIGS. 6 and 7, it has a height substantially equal to that of a hard disc drive (HDD). For example, the overall height of the disc drive unit 1 is reduced to about 9.5 mm but the disc drive unit 1 is capable of recording information on or reproducing information from an optical disc 2 such as a CD (compact disc) or a DVD (digital versatile disc) contained in the disc drive unit 1.

Figure 6:
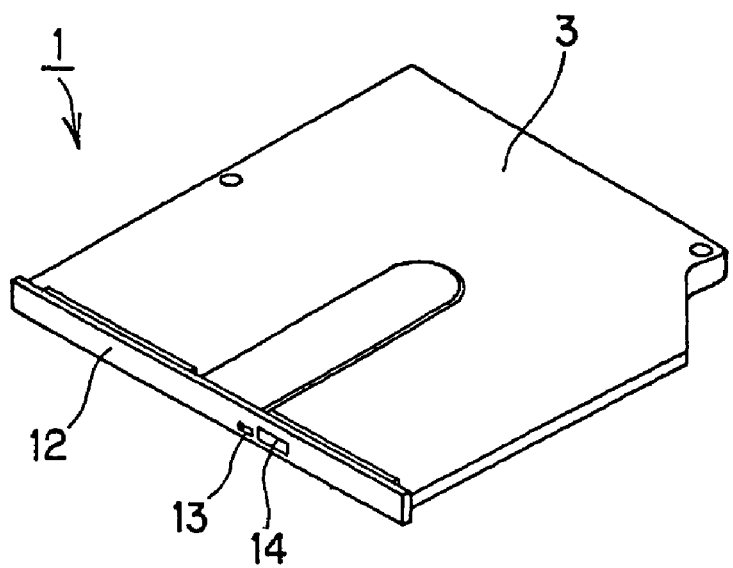
FIG. 6 is a schematic perspective view of a disc drive unit according to the invention in a state where it contains a disc tray.
Figure 7:
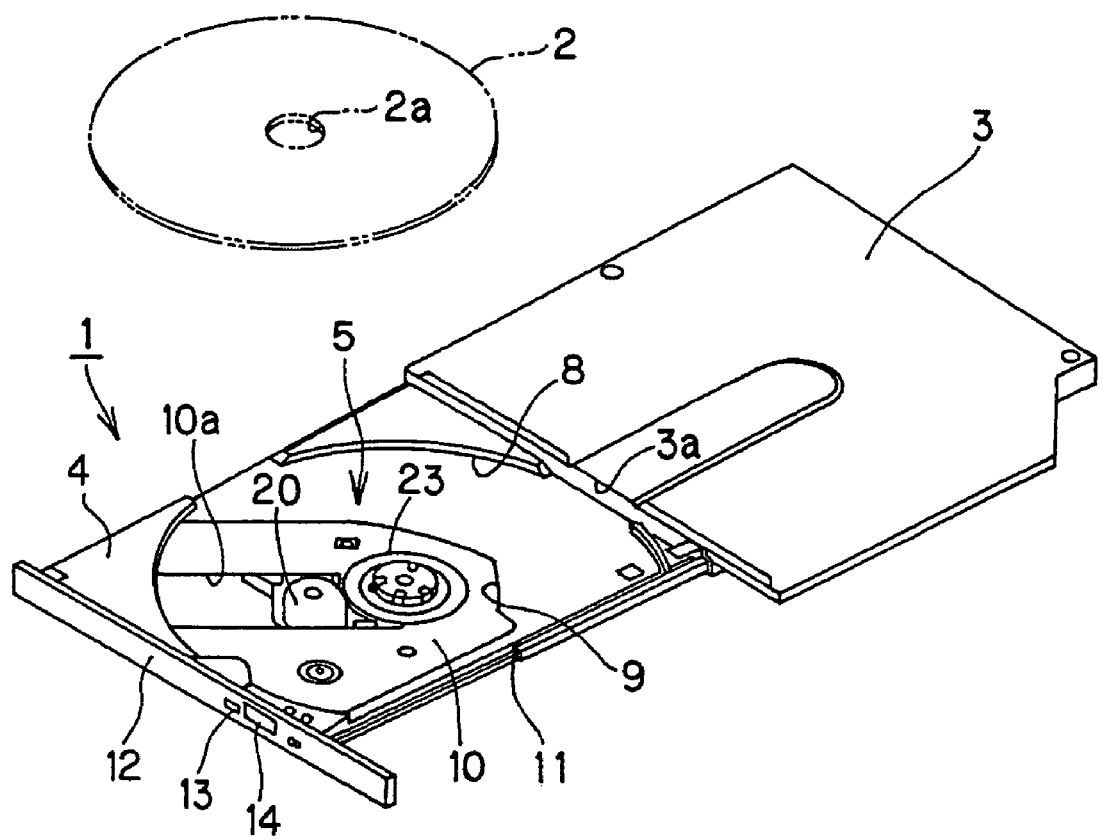
FIG. 7 is a schematic perspective view of the disc drive unit of FIG. 6 in a state where the disc tray is drawn out.
Figure 8:
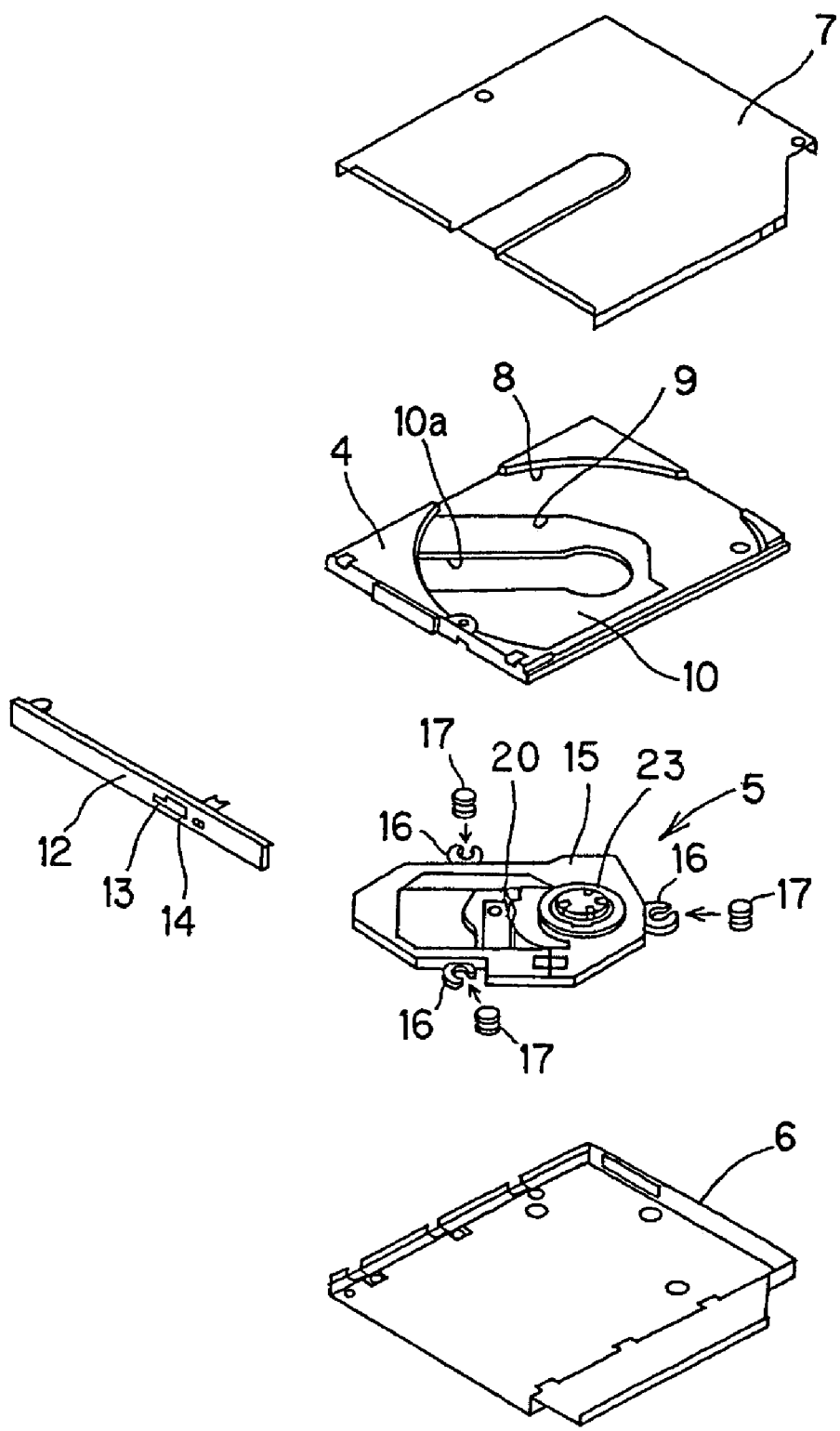
FIG. 8 is an exploded schematic perspective view of a disc drive unit according to the invention.

More specifically, as shown in FIGS. 6, 7 and 8, the disc drive unit 1 comprises a cabinet 3 that is an outer cabinet of the drive main body, a disc tray 4 that can be moved into and out of the cabinet 3 through a tray entrance/exit port 3a formed at the front side of the cabinet 3 and a base unit 5 that is the drive main body fitted to the disc tray 4.

The cabinet 3 is formed by fitting a cover body 7, which is made of a metal plate, to a flat and substantially box-shaped bottom chassis 6, which is also made of a metal plate, by means of screws so as to cover the top aperture of the bottom chassis 6. The cabinet 3 has an opening at the front side thereof that operates as tray entrance/exit port 3a and a containing space is defined in the inside thereof to contain the disc tray 4 therein. A drive control circuit for controlling the operation of driving the components of the disc drive unit main body and a circuit board (not shown) carrying connectors for electrically connecting the disc drive unit 1 to the main body 101 of the note-type personal computer 100 are arranged on the bottom chassis 6.

The disc tray 4 is made of a resin material for molding and has a substantially rectangular profile as a whole. It is provided with a recessed section 8 having a profile corresponding to that of an optical disc 2. An aperture 9 for upwardly exposing the base unit 5 fitted to the lower surface of the disc tray 4 is formed through the bottom of the recessed section 8. As shown in FIG. 7, a styled plate 10 is fitted to the base unit 5, which is upwardly exposed through the aperture 9 in order to partly close the aperture 9. The styled plate 10 is provided with an aperture 10a having a profile corresponding to those of the apertures 18a, 18b that are formed to respectively upwardly expose the spindle motor 23 and the optical pickup 20 of the base unit 5.

The disc tray 4 is supported by a guide rail mechanism 11 arranged between the lateral surfaces thereof and the inner surfaces of the bottom chassis 6 so as to be able to slide between a drawn-out position where it is drawn out to the outside of the cabinet 3 through the tray entrance/exit port 3a, as shown in FIG. 7, and a contained position where it is drawn into the inside of the cabinet 3 through the tray entrance/exit port 3a and contained in the cabinet 3, as shown in FIG. 6. A flat and substantially rectangular front panel 12 is fitted to the front side of the disc tray 4 so as to operate as a closure that closes or opens the tray entrance/exit port 3a of the cabinet 3. The front panel 12 is provided on the front surface thereof with a display section 13 having a lamp that is turned on when the optical disc 2 is accessed to display the access and an eject button 14 to be depressed when ejecting the disc tray 4 to the outside of the cabinet 3.

When the disc tray 4 is contained in the cabinet 3, it is locked by a lock mechanism (not shown) and prevented from sliding toward the front side of the cabinet 3. When the eject button 14 is depressed in the state where the disc tray 4 is locked by the lock mechanism, the disc tray 4 is unlocked so that it is drawn out to the front side of the cabinet 3 through the tray entrance/exit port 3a. Thus, it is possible to draw out the disc tray 4 to the drawn-out position by way of the try entrance/exit port 3a due to the provision of the eject button 14. On the other hand, when the disc tray 4 is pushed into the cabinet 3 to take the contained position in the cabinet 3, it is locked again by the lock mechanism and prevented from sliding toward the front side of the cabinet 3.

The base unit 5 constitutes the disc drive main body and is adapted to drive an optical disc 2 to rotate and write an information signal onto or read an information signal from the optical disc 2 that is held in position. It comprises a base 15, or a unit main body, a disc rotary drive mechanism 19 for holding the optical disc 2 and driving it to rotate, an optical pickup 20 for writing a signal onto or reading a signal from the optical disc 2 being driven to rotate by the disc rotary drive mechanism 19, a pickup feed mechanism 21 for feeding the optical pickup 20 in a radial direction of the optical disc 2 and a skew regulation mechanism 50 for regulating the skew, if any, of the optical pickup 20. The base unit 5 has a very low profile structure where the above listed components are fitted to the lower surface of the base 15.

Figure 9:
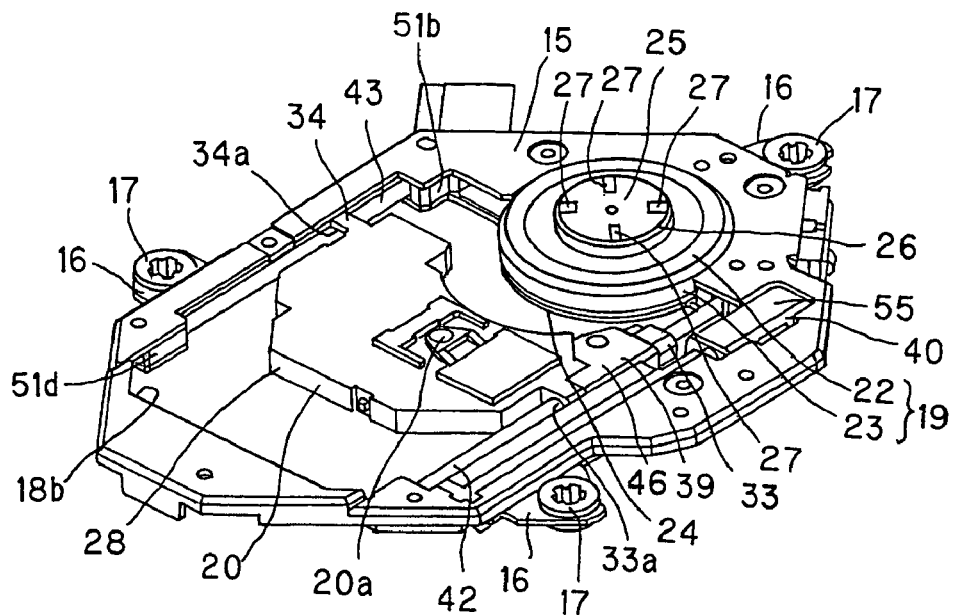
FIG. 9 is a schematic perspective view of the base unit of the disc drive unit of FIG. 8 as viewed from above.

As seen from FIGS. 8 and 9, the base 15 is formed by punching out a metal plate to show a predetermined profile and downwardly bending a narrow marginal area, or an edge part, thereof. Three insulator fitting sections 16 are formed by outwardly bending the edge part that is formed by downwardly bending the metal plate of the base 15. An insulator 17 is fitted to each of the insulator fitting sections 16. The insulators 17 are made of a resilient material such as rubber for the purpose of absorbing vibrations. The base 15 is supported by the spindles arranged on the lower surface of the disc tray 4 by way of the insulators 17. A substantially semicircular turntable exposing aperture 18a for upwardly exposing a turntable 22, which will be described in greater detail hereinafter, and a substantially rectangular pickup exposing aperture 18b for upwardly exposing an optical pickup 20, which will also be described in greater detail hereinafter, are cut through the main surface of the base 15. The turntable exposing aperture 18a and the pickup exposing aperture 18b are continuous relative to each other.

The disc rotary drive mechanism 19 has a flat spindle motor 23 and a turntable 22 for holding an optical disc 2 is arranged on the upper surface of the spindle motor 23, which is by turn supported by a support plate 24. More specifically, the spindle motor 23 includes a stator formed as thin film coil by pattern on a printed circuit board bonded to the support plate 24 and a rotor having a magnet fitted to the inside thereof and arranged vis-à-vis the stator, the turntable 22 being arranged on the upper surface thereof, so that the rotor is driven to revolve by the electromagnetic effect of the magnetic field generated by the electric current flowing through the thin film coil and the magnet. A circuit board is mounted on the support plate 24 and carries thereon a drive control circuit for driving the spindle motor 23 to revolve.

A chucking mechanism 25 is arranged at a central part of the turntable 22 for the purpose of holding the optical disc 2. The chucking mechanism 25 has a centering section 26 to be engaged with the center hole 2a of the optical disc 2 and a plurality of anchor claws 27 for anchoring the optical disc 2 that is engaged with the centering section 25 at respective positions located around the center hole 2a of the optical disc 2. Thus, the chucking mechanism 25 is adapted to hold the optical disc 2 on the turntable 22, while centering the optical disc 2 relative to the turntable 22. The spindle motor 23 of the disc drive mechanism 19 drives optical disc 2 to rotate integrally with the turntable 22 at a constant linear or angular velocity.

As the support plate 24 supporting the spindle motor 23 is held to the base 15 by screws, the bearing member 51 of the skew regulation mechanism 50 is pinched between the lower surface side of the base 15 and the support plate 24.

As shown in FIG. 9, the optical pickup 20 has a substantially rectangular pickup base 28 and an optical block including an objective lens 20a fitted to pickup base 28 and adapted to focus the beam of light emitted from a semiconductor laser that operates as light source and irradiate the signal recording surface of the optical disc 2 and a photo-detector formed by using a light receiving element in order to detect the returning beam of light reflected by the signal recording surface of the optical disc 2. Thus, the optical pickup 20 is adapted to write a signal onto or reads a signal from the optical disc 2.

The optical pickup 20 also has a biaxial actuator (not shown) for driving the objective lens 20a in the direction of the optical axis (focusing direction) and in a direction perpendicular to the optical axis (tracking direction) of the objective lens 20a. Thus, the optical pickup 20 operates for driving the objective lens 20a under control. More specifically, the optical pickup 20 operates for focus servo of aligning the focal point of the objective lens 20a to the signal recording plane of the optical disc 2 and for tracking servo of constantly placing the spot of the beam of light focused by the objective lens 20a on a recording track, while driving the objective lens 20 to move both in the focusing direction and in the tracking direction by means of the biaxial actuator according to the detection signal from the optical disc 2 as detected by the photo-detector.

A pair of guide pieces 33 and a guide piece 34 are formed on the pickup base 28 of the optical pickup 20 so as to be projecting from the respective lateral sides of the pickup base 28 in opposite directions and supported respectively by a pair of guide shafts 42, 43. The guide pieces 33 are separated from each other and arranged respectively at a front position and at a rear position as viewed in the moving direction of the optical pickup 20 and provided with respective guide holes 33a for allowing the corresponding one of the guide shafts, of the guide shaft 42, to pass through them. On the other hand, the guide piece 34 is provided with a guide groove 34a for receiving the other guide shaft 43. Thus, the pickup base 28 can slide along the pair of guide shafts 42, 43.

The optical pickup 20 is subjected to a specific optical axis correcting operation of correcting its optical axis relative to the optical block that includes the light emitting element which may typically be a semiconductor laser, the photodetector and the object lens 20a at the time of assembling. Therefore, it is not necessary to consider a skew margin for the base unit 5 on the basis of the assembling error, or the assembling accuracy, of the optical system of the optical pickup 20.

Figure 10:
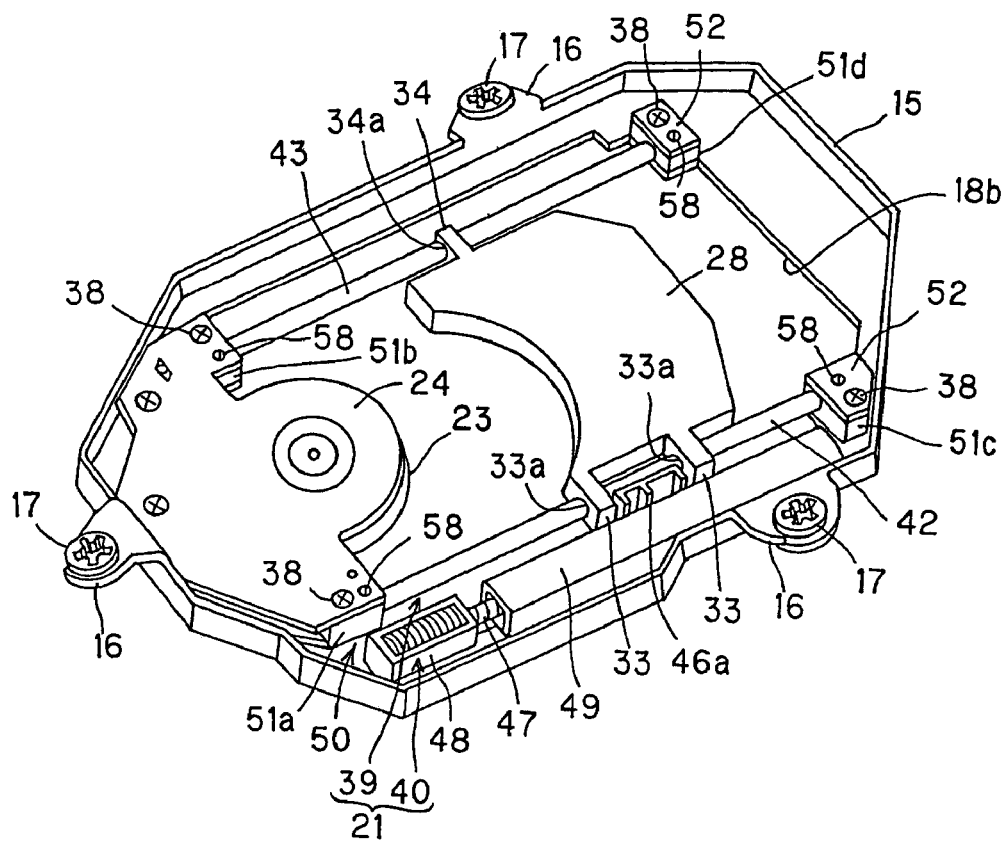
FIG. 10 is a schematic perspective view of the base unit of the disc drive unit of FIG. 8 as viewed from below.

As shown in FIGS. 9 and 10, the pickup feed mechanism 21 includes a guide mechanism 39 for supporting the optical pickup 20 so as to allow the latter to slide in a radial direction of the optical disc 2 and a displacement/drive mechanism 40 for driving the optical pickup 20 supported by the guide mechanism 39 so as to be displaced in a radial direction of the optical disc 2.

The guide mechanism 39 has the pair of guide shafts 42, 43 that supports the pickup base 28 mounted by the optical pickup 20 so as to allow the optical pickup base 28 to slide in a radial direction of the optical disc 2. The guide shafts 42, 43 are arranged in parallel with a radial direction of the optical disc 2 arranged on the turntable 22 so as to support the pickup base 28 and allow it to move in order to guide the optical pickup 20 in the radial direction of the optical disc.

The guide shafts 42, 43 have a substantially cylindrical profile and hence are many round rods. They include insertion shafts 44, 45 formed at the respective opposite end sections 42a, 43a that are inserted respectively into the corresponding bearing members 51 of the skew regulation mechanism 50, which will be described in greater detail hereinafter. The opposite end sections 42a, 43a where the insertion shafts 44, 45 are formed to show a diameter smaller than the diameter of the shaft main bodies of the guide shafts 42, 43 that support the pickup base 28 and hence stepped down from the guide shafts 42, 43. Differently stated, the insertion shafts 44, 45 are projecting in opposite directions from the opposite ends of shaft main bodies of the guide shafts 42, 43.

Figure 11:
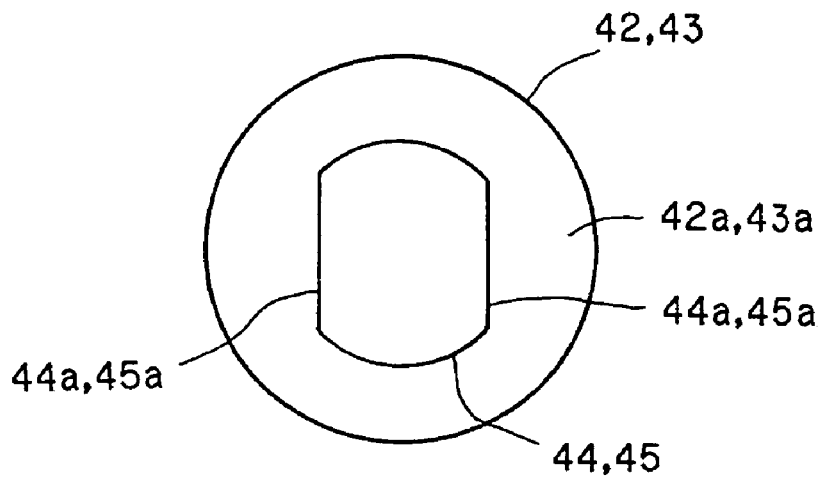
FIG. 11 is a schematic front view of an end of one of the guide shafts of the disc drive unit of FIG. 8.

The insertion shafts 44, 45 have a substantially cylindrical profile and hence are so many round rods whose diameter is smaller than that of the shaft main bodies of the guide shafts 42, 43. Each of the insertion shafts 44, 45 may be provided with a pair of sliding surfaces 44a, 45a, as shown in FIG. 11, that are held in sliding contact with the inner surface of the guide slit 54 of the corresponding one of the bearing members 51. The pair of sliding surfaces 44a, 45a is formed by cutting the corresponding insertion shaft 44 or 45 from the outer periphery thereof that is to be held in sliding contact with the inner surface of the guide slit 54 along the sliding direction. The pair of sliding surfaces 44a, 45a is made flat within the range by which the insertion shaft 44 or 45 is inserted into the guide slit 54 from the front end thereof.

The guide shaft 42 is inserted into the guide holes 33a formed respectively in the pair of guide pieces 33 of the pickup base 28. On the other hand, the guide shaft 43 is held in the guide groove 34a formed in the guide piece 34 of the pickup base 28 so as to be able to freely slide in it. Additionally, the pair of guide shafts 42, 43 is arranged below the lower surface of the base 15 in parallel with a radial direction of the optical disc 2 and also with each other so that the pickup base 28 that is exposed to the objective lens 20a through the pickup exposing aperture 18b of the base 15 is guided from the inner periphery to the outer periphery or vice versa. The opposite ends of the pair of guide shafts 42, 43 are fitted to the lower surface of the base 15 by way of the skew regulation mechanism 50.

Figure 12:
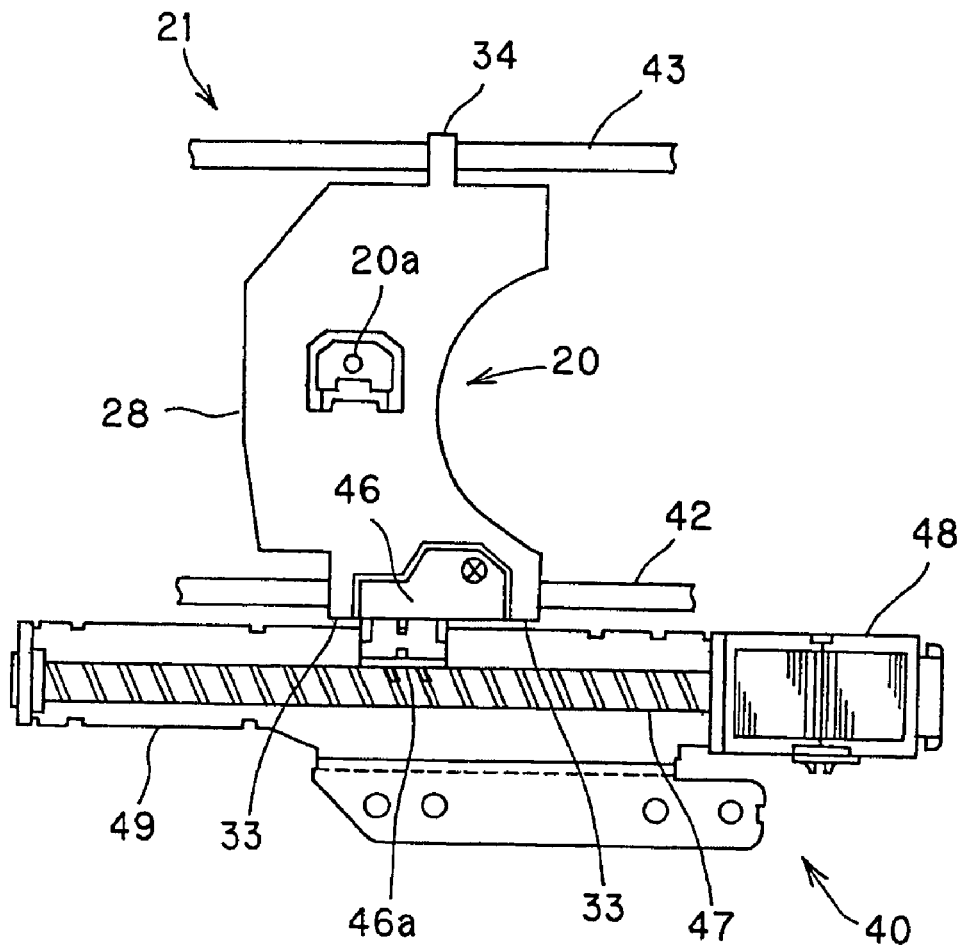
FIG. 12 is a schematic plan view of the pickup feed mechanism of the disc drive unit of FIG. 8, illustrating the configuration thereof.

Referring to FIGS. 9, 10 and 12, the displacement/drive mechanism 40 includes a rack member 46 fitted to the pickup base 28, a lead screw 47 to be engaged with the rack member 46 and a drive motor 48 for driving the lead screw 47 to revolve.

The rack member 46 is arranged between the pair of guide pieces 33 and fitted at the base end side thereof to the pickup base 28, and the rack section 46a of the rack member 46 that is to be engaged with the lead screw 47 arranged in parallel with the pair of guide shafts 42 is integrally formed at the front end side of the rack member 46. The lead screw 47 is integrally formed with the drive shaft of the drive motor 48 and a spiral screw thread is formed on the outer peripheral surface thereof so as to be engaged with the rack section 46a of the rack member 46. The drive motor 48 is a so-called stepping motor that is adapted to drive the lead screw 47 to revolve according to the drive pulse applied to it. Both the lead screw 47 and the drive motor 48 are supported by a bracket 49 fitted to the lower surface of the base 15 by means of screws. The bracket 49 shows a profile produced by bending opposite ends of an oblong metal plate in a same direction, and the drive motor 48 is rigidly held at the side of one of the ends of the bracket 49 with the lead screw 47 running through the bracket 49, while the front end of the lead screw 47 is held in a shaft hole formed through the other end of the bracket 49 and supported by the end so as to allow the lead screw 47 to freely revolve.

In the pickup feed mechanism 21, the drive motor 48 drives the lead screw. 47 so as to by turn drive the rack member 46 and displace it in the axial direction of the lead screw 47 due to the engagement of the screw thread of the lead screw 47 and the rack section 46a. As a result, the optical pickup 20 is fed integrally with the pickup base 28 in a direction running along the pair of guide shafts 42, 43, or in a radial direction of the optical disc 2.

Now, the skew regulation mechanism 50 adapted to correct the optical axis of the optical pickup 20 supported by the paired guide shafts 42, 43 by correcting the inclination of each of the paired guide shafts 42, 43.

The skew regulation mechanism 50 adjusts the inclination of each of the guide shafts 42, 43 by independently adjusting the positions where the end sections 42a, 43a of the guide shafts 42, 43 are supported in order to regulate the optical axis of the optical pickup 20, while movably supporting the opposite end sections 42a, 43a of the paired guide shafts 42, 43 in a direction perpendicular to the main surface of the base 15.

Figure 13:
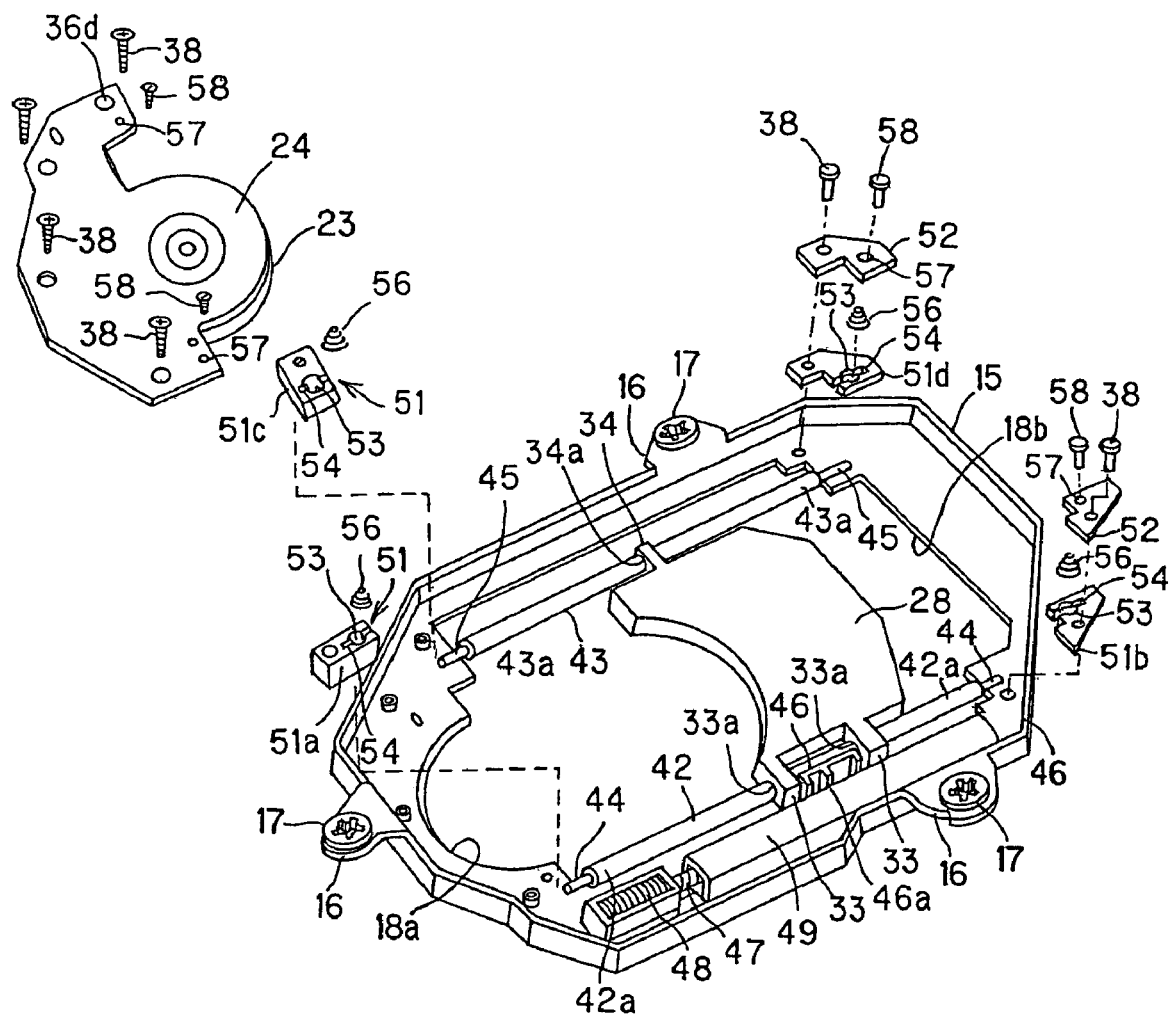
FIG. 13 is an exploded schematic perspective view of the base unit of FIG. 10 as viewed from below.
Figure 14:
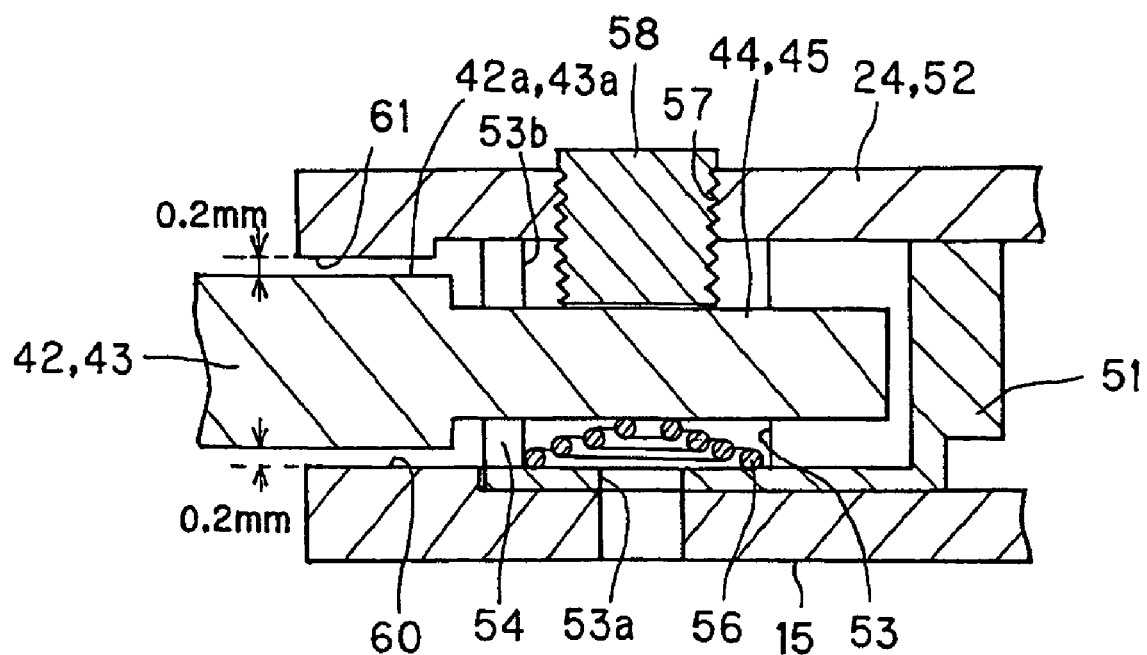
FIG. 14 is a schematic cross sectional view of a skew regulation mechanism that can be used for the disc drive unit of FIG. 8 as viewed in a direction perpendicular to the axial line thereof.

More specifically, referring to FIGS. 13 and 14, the skew regulation mechanism 50 includes bearing members 51 for receiving the respective insertion shafts 44, 45 projecting from the opposite end sections 42a, 43a of the paired guide shafts 42, 43 and supporting the guide shafts 42, 43. The bearing members 51 include first and second bearing members 51a, 51b arranged near the pickup exposing aperture 18a of the base 15 and close to the inner periphery of the optical disc 2 to support the corresponding ends of the guide shafts 42, 43 and third and fourth bearing members 51c, 51d arranged close to the outer periphery of the optical disc 2 to support the corresponding ends of the guide shafts 42, 43. The first and third bearing members 51a, 51c supporting the corresponding ends of the guide shafts 42, 43 at the inner peripheral side of the optical disc 2 are pinched between the lower surface of the base 15 and the above described support plate 24 and rigidly held to the lower surface of the base 15 as screws 38 are respectively driven to run through them from the side of the support plate 24 to the side of the base 15. On the other hand, the second and fourth bearing members 51*b*, 51*d* supporting the corresponding ends of the guide shafts 42, 43 at the outer peripheral side of the optical disc 2 are pinched between the lower surface of the base 15 and respective second support plates 52, 52 and rigidly held to the lower surface of the base 15 as screws 38 are driven respectively to run through them from the side of the second support plates 52, 52 to the side of the base 15.

More specifically, the bearing members 51 are formed to show a predetermined height to an enhanced level of precision by injection molding of a resin molding material by means of a metal mold. A liquid crystal polymer that is highly rigid and shows a low coefficient of thermal contraction is preferably used for the resin molding material. Then, as a result, it is possible to align the vertical position of the turntable 22 relative to the base 15 and highly precisely maintain the parallelism of the base 15 and the turntable 22.

Each of the bearing members 51 holds a coil spring 56 that operates as urging member and provided with a holding hole 53 for receiving the corresponding insertion shaft 44 or 45 formed at the corresponding end section 42*a* or 43*a* of the corresponding guide shaft 42 or 43, whichever appropriate, and a guide slit 54 exposed to the holding hole 53 so as to guide the vertical movement of the insertion shaft 44 or 45, whichever appropriate.

The holding hole 53 is a through hole running by all the height of the bearing member 51 and having a substantially circular cross section. On the other hand, the coil spring 56 that is held in the inside of the holding hole 53 shows a conical profile with the large diameter side thereof located at the side of the base 15 and the small diameter side thereof located at the side of the guide shaft 42 or 43. Thus, it is arranged between the base 15 and the corresponding insertion shaft 44 or 45 formed at the corresponding end section 42*a* or 43*a* of the guide shaft 42 or 43, whichever appropriate, in a compressed state. Therefore, the coil spring 56 abuts the insertion shaft 44 or 45, whichever appropriate, from one of the opposite sides thereof as viewed in a direction perpendicular to the main surface of the base 15 and urges the insertion shaft 44 or 45, whichever appropriate, in a direction perpendicular to the main surface of the base 15 (trying to move it away from the base 15).

Since the substantially conical coil spring 56 is compressed in such a way that the small diameter side thereof is forced to move into the large diameter side thereof, it is possible to minimally limit its height in a compressed state. Thus, it positively takes part in the effort for realizing a low profile skew regulation mechanism 50. It will be appreciated that the coil springs that operate as urging members may be replaced by leaf springs or some other spring members or by hollow cylindrical resilient members typically made of silicon rubber.

The holding hole 53 has an opening 53*a* at the end thereof located at the side of the base 15. The opening 53*a* is made continuous to the injection hole formed through the base 15 as the bearing member 51 is pinched between the base 15 and the support plate 24 or one of the support plates 52. The holding hole 53 is regulated to an optimal skew height by the skew regulation mechanism 50 and subsequently made to maintain the optimal skew height as an adhesive agent is injected into it by way of the opening 53*a*. The holding hole 53 has another opening 53*b* at the end thereof located at the side of the support plate 24 or one of the support plates 52. The opening 53*b* is made continuous to the screw hole 57 formed through the support plate 24 or one of the support plates 52 as the bearing member 51 is pinched between the base 15 and the support plate 24 or 52, whichever appropriate. A skew regulation screw 58 is driven into the holding hole 53 by way of the screw hole 57 through the support plate 24 or one of the support plates 52, whichever appropriate, and the opening 53*b* until it abuts the corresponding insertion shaft 44 or 45, whichever appropriate, so as to regulate the inclination of the insertion shaft 44 or 45, whichever appropriate.

The guide slit 54 is linearly formed by cutting the bearing member 51 in the sense of the height thereof so as to show a length that matches the length of the small diameter insertion shaft 44 or 45 formed at the corresponding end section 42*a* or 43*a* of the corresponding guide shaft 42 or 43, whichever appropriate. Thus, when the insertion shaft 44 or 45 of the guide shaft 42 or 43, whichever appropriate, is inserted into the guide slit 54, the latter guides the former in a direction perpendicular to the main surface of the base 15, or in a direction moving close to or away from the main surface of the base 15. The guide slit 54 is exposed to the holding hole 53 and allows the insertion shaft 44 or 45, whichever appropriate, to run into the holding hole 53.

Each of the bearing members 51 of the skew regulation mechanism 50 is pinched between the base 15 and the support plate 24 or one of the support plates 52 and rigidly held in position by screws 38. Then, as the corresponding insertion shaft 44 or 45 of the guide shaft 42 or 43, whichever appropriate, is inserted into the holding hole 53 by way of the guide slit 54, the bearing member 51 supports the guide shaft 42 or 43, whichever appropriate. The insertion shaft 44 or 45 that is inserted into the bearing member 51 is provided in advance with the coil spring 56, which is located in the holding hole 53 at a position close to the base 15. Thus, as the skew regulation screw 58 is driven into the holding hole 53 from the screw hole 57 formed through the support plate 24 or one of the support plates 52, whichever appropriate, the insertion shaft 44 or 45, whichever appropriate, is pinched between the small diameter front end of the coil spring 56 and the front end of the skew regulation screw 58.

Thus, it is possible to conduct an operation of skew regulation on the optical pickup 20 by regulating the extent by which the skew regulation screw 58 is driven into the holding hole 53. More specifically, the front end of the skew regulation screw 58 is forced to abut the insertion shaft 44 or 45 from the side of the support plate 24 or one of the support plates 52, whichever appropriate, in a direction perpendicular to the main surface of the base 15 and presses the insertion shaft 44 or 45, whichever appropriate, in the direction opposite to the urging direction of the coil spring 56. Therefore, the compressed state of the coil spring 56 can be changed by regulating the extent by which the skew regulation screw 58 is driven into the holding hole 53. As a result, the insertion shaft 44 or 45 slide in the guide slit 54 of the bearing member 51 to make it possible to appropriately regulate the position at which it is supported by the coil spring 56 and the skew regulation screw 58.

As shown in FIG. 14, the base 15 and each of the support plate 24 and the support plates 52 have respective limiting sections 60, 61 projecting toward the bearing member 51 they pinch. The limiting sections 60, 61 are arranged vis-à-vis the corresponding large diameter end section 42*a* or 43*a* of the shaft main body of the guide shaft 42 or 43, whichever appropriate, as a pair so as to limit the movable range of the guide shaft 42 or 43, whichever appropriate, in the sense of the height thereof.

As pointed out earlier, since the optical pickup 20 is subjected to an operation of skew regulation for the optical axis thereof independently relative to the optical block, it is not necessary to consider a skew margin for the base unit 5 on the basis of the assembling error, or the assembling accuracy, of the optical system of the optical pickup 20. On the other hand, a skew margin is provided by assuming ±0.4 mm for the dimensional errors, or the dimensional accuracies, of the components and the assembling errors, or the assembling accuracies, of the components of the base unit 5, including the errors that may arise in the optical system of the optical pickup 20.

Therefore, if a total skew margin of ±0.4 mm is provided for the assembling errors to be tolerated for the components of the base unit 5 comprising the optical pickup 20, for the optical system of which an operation of skew regulation is conducted in advance, there arises a risk of not rejecting base units 5 whose components other than the optical system of the optical pickup 20 have errors beyond the tolerance.

In view of this risk, in the base unit 5 of a disc drive unit according to the invention, the base 15 and each of the support plates 24, 52 are provided respectively with pairs of limiting sections 60, 61 projecting toward the corresponding bearing member 51 for the purpose of limiting the movable range of the guide shafts 42, 43 in the sense of the height thereof More specifically, each of the pairs of the limiting sections 60, 61 is arranged vis-à-vis the corresponding shaft main body of the guide shaft 42 or 43 and the inclination of each of the guide shafts 42, 43 is regulated by the skew regulation section 50 so as to make the limiting sections 60, 61 abut the shaft main body of the guide shaft 42 or 43, whichever appropriate, and limit the movable range of the guide shafts 42, 43 within ±0.2 mm from the designed initial position shown in FIG. 14 in the sense of the height thereof.

As a result, the base unit 5 is regulated in such a way that the total of the dimensional error and the assembling error of each of the components of the base unit 5 is limited to ±0.2 mm. In other words, base units that require an operation of skew regulation beyond this range are rejected. In this way, according to the invention, base units having a component whose dimensional accuracy and assembling accuracy are beyond the above defined tolerance are rejected so that troubles such as those where the pickup base 28 scrapes the bottom chassis 6 of the cabinet 3 when the pickup base 28 is moved along the guide shafts 42, 43 in a radial direction of the optical disc 2 are avoided.

Additionally, the limiting sections 60, 61 are arranged as pairs in the sense of the height of the guide shafts 42, 43. Thus, the limiting sections 60, 61 suppress the skew margin of the guide shafts 42, 43 to a range of a total of 0.4 mm and, at the same time, allow a skew margin of ±0.2 mm from the designed initial position of the guide shafts 42, 43 in the sense of the height thereof as described above by referring to FIG. 14.

Each of the pairs of limiting sections 60, 61 is arranged vis-à-vis the shaft main body of the corresponding one of the guide shafts 42, 43 because the insertion shafts 42, 43 are produced by cutting the shaft main bodies and made to show a small diameter relative to the shaft main bodies and hence the skew margin can be reduced more reliably by limiting the movable range of the large diameter shaft main bodies rather than by limiting the movable range of the small diameter guide shafts 42, 43 when the tolerance of the cutting process is taken into consideration. In other words, each of the pairs of limiting sections 60, 61 may be arranged vis-à-vis the insertion shaft 44 or 45 of the corresponding guide shaft 42 or 43, whichever appropriate, when the tolerance of the cutting process does not arise any problem.

As described above, skew regulation mechanism 50 regulates the inclination of each of the guide shafts 42, 43 after assembling the base unit 5 by fitting the support plates 24, 52 and the bearing members 51 to the base 15 and then also fitting the guide shafts 42, 43 that support the pickup base 28 of the optical pickup 20 to the base 15, while mounting the spindle motor 23 and the turntable 22. More specifically, the skew regulation mechanism 50 causes the beam of light emitted from the optical system of the optical pickup 20 to irradiate a skew regulation disc and detects the return light and then it regulates the inclination of each of the guide shafts 42, 43 and hence that of the optical axis so as to make the beam of light perpendicularly irradiate the signal recording surface of the skew regulation disc.

At this time, the skew regulation mechanism 50 shifts each of the insertion shafts 44, 45 in the sense of the height of the guide slit 54 of the corresponding one of the bearing members 51 by regulating the extent by which the skew regulation screw 58 is driven into the holding hole 53 to change the compressed state of the corresponding coil spring 56 of the bearing member 51 that urges the insertion shaft 44 or 45 from the opposite side. Since the range of regulation of the skew regulation mechanism 50 in the sense of the height of the guide slit 54 is limited to ±0.2 mm from the designed initial position by the limiting sections 60, 61 arranged respectively on the base 15 and the support plate 24 or one of the support plates 54, it is not possible to correct the optical axis of the base unit 5 that requires regulation of the skew height beyond the range so that such a base unit 5 is rejected from the line for manufacturing disc drive units.

Since the sliding surfaces 44a, 45a formed by partly cutting the outer peripheries of the insertion shafts 44, 45 move and slide in the corresponding respective guide slits 54, the insertion shafts 44, 45 inserted into the respective guide slits 54 are prevented to revolve around the respective axes. Once the optimal skew height is determined by the skew regulation mechanism 50, an adhesive agent is injected through the injection holes arranged in the base 15 and also through the openings 53a arranged in the respective holding holes 53 of the bearing members 51. The adhesive agent may typically be made of UV-setting resin. As the adhesive agent is injected into the holding holes of the bearing members 51 and set after the operation of skew regulation, the positions supporting the ends of the insertion shafts 44, 45 are rigidly defined.

In the above-described base unit 5, each of the pairs of limiting sections 60, 61 projects from the base 15 and the support plate 24 or one of the support plates 52 to limit the movable range of the guide shaft 42 or 43, whichever appropriate. However, in a disc drive unit 1 according to the invention, the limiting sections for limiting the movable ranges of the guide shafts 42, 43 may alternatively be arranged in the bearing members that support the insertion shafts 44, 45 of the guide shafts 42, 43.

Figure 15:
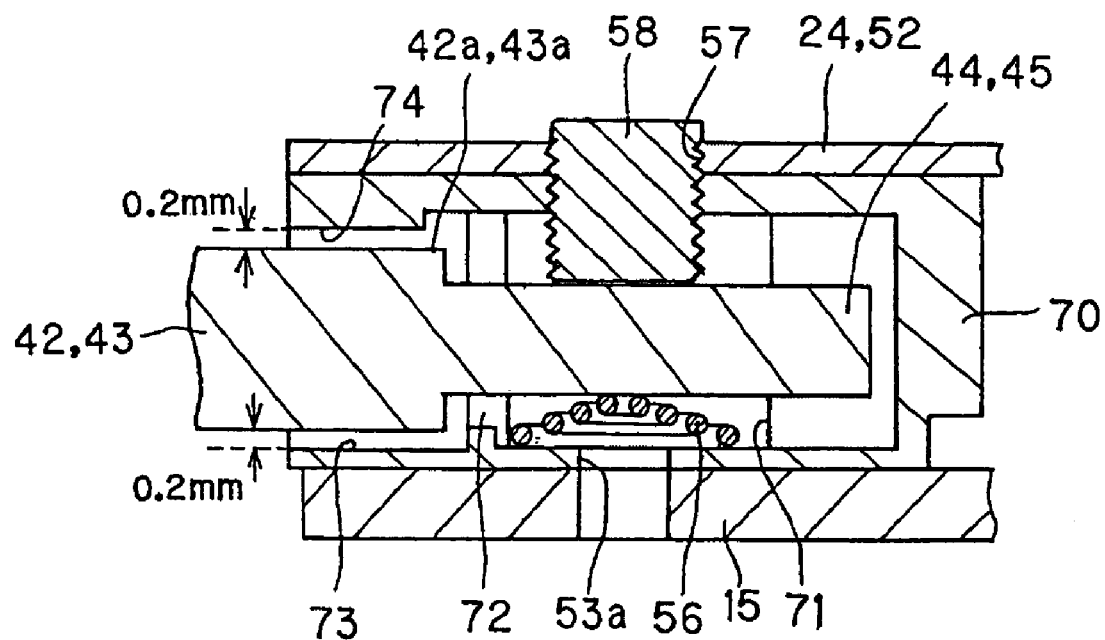
FIG. 15 is a schematic cross sectional view of another skew regulation mechanism that can be used for the disc drive unit of FIG. 8 as viewed in a direction perpendicular to the axial line thereof.

FIG 15 illustrates such bearing members. Referring now to FIG. 15, each of the bearing members 70 is pinched between the base 15 and the corresponding one of the support plates 24, 52 and rigidly fitted to the lower surface of the base 15 as a screw (not shown) is driven from the support plate 24 or 52, whichever appropriate, into the base 15 as in the case of the above described bearing members 51. Additionally, each of the bearing members 70 holds the corresponding coil spring 56 that operates as a member for urging the corresponding insertion shaft 44 or 45 and a limiting section 73 or 74 is defined to limit the moving range of the insertion shaft 44 or 45, whichever appropriate, along with the holding hole 71 for receiving the insertion shaft 44 or 45, whichever appropriate, the guide slit 72 exposed to the holding hole 71 and adapted to guide the insertion shaft 44 or 45, whichever appropriate, in the sense of the height thereof that abut the corresponding end section 42a or 43a of the guide shaft 42 or 43, whichever appropriate.

The holding hole 71 has a configuration similar to that of the holding hole 53 of the above-described bearing member 51 and the guide slit 72 also has a configuration similar to the guide slit 54 of the above described bearing member 51. The limiting sections 73, 74 are arranged at the respective positions located vis-à-vis the respective corresponding end sections 42a, 43a of the guide shafts 42, 43 of the bearing members 70 that receive the respective corresponding insertion shafts 44, 45 so that they abut the corresponding respective shaft main bodies of the guide shafts 42, 43 as the inclination of each of the guide shafts 42, 43 is regulated by the skew regulation mechanism 50 so as to limit the moving range of the guide shafts 42, 43 to ±0.2 mm from the designed initial position in the sense of the height thereof, as shown in FIG. 15.

A pair of limiting sections 73, 74 is arranged at each end of the guide shafts 42, 43 in the sense of the height of the latter as in the case of the corresponding pair of limiting sections 60, 61. However, each of the pairs of limiting sections 73, 74 may be arranged vis-à-vis the insertion shaft 44 or 45, whichever appropriate, when the tolerance of the cutting process does not raise any problem.

The present invention is described above by way of a preferred embodiment of disc drive unit 1 according to the invention. The skew regulation mechanism 50 of the above described disc drive unit 1 has coil springs 56 arranged at the side of the base 15 and pinching the guide shaft 42 or 43 and skew regulation screws 58 arranged at the side of the respective support plates 24, 52 in the above description. However, alternatively, the skew regulation screws 58 may be arranged at the side of the base 15 and pinching the guide shaft 42 or 43 and the coil springs 56 may be arranged at the side of the respective support plates 24, 52.

Additionally, the bearing members 51 or 70 may be integrally formed with the respective support plates 24, 52.

It should be understood by those skilled in the art that various modifications, combinations, sub-combinations and alterations may occur depending on design requirements and other factors insofar as they are within the scope of the appended claims or the equivalents thereof.

What is claimed is:

1. A disc drive unit comprising:
a base plate;
a disc rotary drive mechanism for holding an optical disc and driving the optical disc to rotate;
an optical pickup for writing a signal on and/or reading a signal from the optical disc by focusing the light beam emitted from a light source on the signal recording surface of the optical disc by means of an objective lens and detecting the returning beam of light reflected by the optical disc;
a pair of guide shafts arranged at the lower surface side of the base plate to allow the optical pickup to slide in a radial direction of the optical disc;
support means, each being adapted to support the corresponding one of the guide shafts at the lower surface side of the base plate by pinching the opposite ends of the guide shafts between itself and the base plate;
urging members arranged to abut the respective ends of the guide shafts from a direction substantially perpendicular to the main surface of the base plate and urging the respective ends of the guide shafts in a direction perpendicular to the main surface of the base plate;
regulation members arranged to abut the respective ends of the guide shafts from the direction opposite to the direction substantially perpendicular to the main surface of the base plate and pressing the respective ends of the guide shafts in the direction opposite to the urging direction of the urging members so as to regulate the supported positions of the ends of the guide shafts;
skew regulation means having respective bearings including respective holding holes for holding the respective urging members, respective guide slits exposed to the respective holding holes to receive the respective ends of the guide shafts and guide the respective ends of the guide shafts in a direction perpendicular to the main surface of the base plate and respective insertion holes exposed to the respective holding holes and adapted to receive the respective regulation members; and
limiting sections arranged between the base plate and the corresponding respective support means and adapted to limit the respective movable ranges of the guide shafts driven to move by the respective skew regulation means in a direction substantially in a direction perpendicular to the main surface of the base plate.

2. The unit according to claim 1, wherein the limiting sections are arranged on the base plate and the respective support means and adapted to limit the respective moving ranges of the guide shafts in a direction substantially perpendicular to the main surface of the base plate and in the direction opposite to the direction.

3. The unit according to claim 1, wherein the limiting sections are arranged on the respective bearing sections of the skew regulation means and adapted to limit the respective moving ranges of the guide shafts in a direction substantially perpendicular to the main surface of the base plate and in the direction opposite to the direction.

4. The unit according to claim 1, wherein
the guide shafts have a shaft section and insertion sections having a diameter smaller than the diameter of the shaft section and formed at the opposite ends so as to be inserted into the respective guide slits formed in the respective bearing sections of the skew regulation means; and
the limiting sections are adapted to limit the respective moving ranges of the guide shafts by abutting the respective shaft sections of the guide shafts.

5. The unit according to claim 1, wherein the bearing sections and the limiting sections are molded by using a liquid crystal polymer material.

6. The unit according to claim 1, wherein the optical block of the optical pickup unit is corrected for its optical axis.

7. A disc recording and/or reproducing apparatus comprising:
an apparatus main body including a pair of upper and lower halves;
disc transfer means for transferring an optical disc from the outside to the inside of the apparatus main body or vice versa through a lateral side of the apparatus main body;
a base plate;
a disc rotary drive mechanism for holding an optical disc and driving the optical disc to rotate;
an optical pickup for writing a signal on and/or reading a signal from the optical disc by focusing the light beam emitted from a light source on the signal recording surface of the optical disc by means of an objective lens and detecting the returning beam of light reflected by the optical disc;

a pair of guide shafts arranged at the lower surface side of the base plate to allow the optical pickup to slide in a radial direction of the optical disc;

support means, each being adapted to support the corresponding one of the guide shafts at the lower surface side of the base plate by pinching the opposite ends of the guide shafts between itself and the base plate;

urging members arranged to abut the respective ends of the guide shafts from a direction substantially perpendicular to the main surface of the base plate and urging the respective ends of the guide shafts in a direction perpendicular to the main surface of the base plate;

regulation members arranged to abut the respective ends of the guide shafts from the direction opposite to the direction substantially perpendicular to the main surface of the base plate and pressing the respective ends of the guide shafts in the direction opposite to the urging direction of the urging members so as to regulate the supported positions of the ends of the guide shafts;

skew regulation means having respective bearings including respective holding holes for holding the respective urging members, respective guide slits exposed to the respective holding holes to receive the respective ends of the guide shafts and guide the respective ends of the guide shafts in a direction perpendicular to the main surface of the base plate and respective insertion holes exposed to the respective holding holes and adapted to receive the respective regulation members; and limiting sections arranged between the base plate and the corresponding respective support means and adapted to limit the respective movable ranges of the guide shafts driven to move by the respective skew regulation means in a direction substantially in a direction perpendicular to the main surface of the base plate.

8. The apparatus according to claim 7, wherein the limiting sections are arranged on the base plate and the respective support means and adapted to limit the respective moving ranges of the guide shafts in a direction substantially perpendicular to the main surface of the base plate and in the direction opposite to the direction.

9. The apparatus according to claim 7, wherein the limiting sections are arranged on the respective bearing sections of the skew regulation means and adapted to limit the respective moving ranges of the guide shafts in a direction substantially perpendicular to the main surface of the base plate and in the direction opposite to the direction.

10. The apparatus according to any of claims 7 to 9, wherein
the guide shafts have a shaft section and insertion sections having a diameter smaller than the diameter of the shaft section and formed at the opposite ends so as to be inserted into the respective guide slits formed in the respective bearing sections of the skew regulation means; and
the limiting sections are adapted to limit the respective moving ranges of the guide shafts by abutting the respective shaft sections of the guide shafts.

11. The apparatus according to claim 7, wherein the bearing sections and the limiting sections are molded by using a liquid crystal polymer material.

12. The apparatus according to claim 7, wherein the optical block of the optical pickup unit is corrected for its optical axis.

13. A disc drive unit comprising:
a base plate;
a disc rotary drive mechanism for holding an optical disc and driving the optical disc to rotate;
an optical pickup for writing a signal on and/or reading a signal from the optical disc by focusing the light beam emitted from a light source on the signal recording surface of the optical disc by means of an objective lens and detecting the returning beam of light reflected by the optical disc;
a pair of guide shafts arranged at the lower surface side of the base plate to allow the optical pickup to slide in a radial direction of the optical disc;
support sections, each being adapted to support the corresponding one of the guide shafts at the lower surface side of the base plate by pinching the opposite ends of the guide shafts between itself and the base plate;
urging members arranged to abut the respective ends of the guide shafts from a direction substantially perpendicular to the main surface of the base plate and urging the respective ends of the guide shafts in a direction perpendicular to the main surface of the base plate;
regulation members arranged to abut the respective ends of the guide shafts from the direction opposite to the direction substantially perpendicular to the main surface of the base plate and pressing the respective ends of the guide shafts in the direction opposite to the urging direction of the urging member so as to regulate the supported positions of the ends of the guide shafts;
a skew regulation section having respective bearings including respective holding holes for holding the respective urging members, respective guide slits exposed to the respective holding holes to receive the respective ends of the guide shafts and guide the respective ends of the guide shafts in a direction perpendicular to the main surface of the base plate and respective insertion holes exposed to the respective holding holes and adapted to receive the respective regulation members; and
limiting sections arranged between the base plate and the corresponding respective support section and adapted to limit the respective movable ranges of the guide shafts driven to move by the respective skew regulation section in a direction substantially perpendicular to the main surface of the base plate.

14. A disc recording and/or reproducing apparatus comprising:
an apparatus main body including a pair of upper and lower halves;
a disc transfer section that transfers an optical disc from the outside to the inside of the apparatus main body or vice versa through a lateral side of the apparatus main body;
a base plate;
a disc rotary drive mechanism for holding an optical disc and driving the optical disc to rotate;
an optical pickup for writing a signal on and/or reading a signal from the optical disc by focusing the light beam emitted from a light source on the signal recording surface of the optical disc by means of an objective lens and detecting the returning beam of light reflected by the optical disc;
a pair of guide shafts arranged at the lower surface side of the base plate to allow the optical pickup to slide in a radial direction of the optical disc;
support sections, each being adapted to support the corresponding one of the guide shafts at the lower surface side of the base plate by pinching the opposite ends of the guide shafts between itself and the base plate;
urging members arranged to abut the respective ends of the guide shafts from a direction substantially perpendicular to the main surface of the base plate and urging the respective ends of the guide shafts in a direction perpendicular to the main surface of the base plate;

regulation members arranged to abut the respective ends of the guide shafts from the direction opposite to the direction substantially perpendicular to the main surface of the base plate and pressing the respective ends of the guide shafts in the direction opposite to the urging direction of the urging member so as to regulate the supported positions of the ends of the guide shafts;

a skew regulation section having respective bearings including respective holding holes for holding the respective urging members, respective guide slits exposed to the respective holding holes to receive the respective ends of the guide shafts and guide the respective ends of the guide shafts in a direction perpendicular to the main surface of the base plate and respective insertion holes exposed to the respective holding holes and adapted to receive the respective regulation members; and limiting sections arranged between the base plate and the corresponding respective support section and adapted to limit the respective movable ranges of the guide shafts driven to move by the respective skew regulation section in a direction substantially perpendicular to the main surface of the base plate.

* * * * *